United States Patent
Abe

(10) Patent No.: US 9,348,330 B2
(45) Date of Patent: May 24, 2016

(54) METHOD OF ADJUSTING THE POSITION OF ORIGIN OF A MACHINE AND A MACHINE HAVING A FUNCTION FOR ADJUSTING THE POSITION OF ORIGIN

(75) Inventor: Hiroyuki Abe, Minamitsuru-gun (JP)

(73) Assignee: FANUC Corporation, Minamitsuru-gun, Yamanashi (JP)

( * ) Notice: Subject to any disclaimer, the term of this patent is extended or adjusted under 35 U.S.C. 154(b) by 937 days.

(21) Appl. No.: 13/585,946

(22) Filed: Aug. 15, 2012

(65) Prior Publication Data

US 2013/0090754 A1    Apr. 11, 2013

(30) Foreign Application Priority Data

Oct. 7, 2011  (JP) .................................. 2011-223216

(51) Int. Cl.
  *G05B 19/404*  (2006.01)
(52) U.S. Cl.
  CPC .... *G05B 19/404* (2013.01); *G05B 2219/37153* (2013.01); *G05B 2219/50025* (2013.01)
(58) Field of Classification Search
  USPC ......................................................... 700/186
  See application file for complete search history.

(56) References Cited

U.S. PATENT DOCUMENTS

| 3,843,915 | A | * | 10/1974 | Helmbold ...................... 318/602 |
| 5,034,672 | A |   | 7/1991 | Sakamoto et al. |
| 5,465,036 | A |   | 11/1995 | Yasuhara |
| 2004/0232870 | A1 |   | 11/2004 | Mizukami |

FOREIGN PATENT DOCUMENTS

| JP | 62-95604 | 5/1987 |
| JP | 02083708 A | 3/1990 |
| JP | 3-32551 | 2/1991 |
| JP | 2811087 | 4/1991 |
| JP | 6-332533 | 12/1994 |

* cited by examiner

*Primary Examiner* — Carlos Ortiz Rodriguez
(74) *Attorney, Agent, or Firm* — Drinker Biddle & Reath LLP

(57) ABSTRACT

A machine having a function for adjusting the position of mechanical origin of a moving part (10) that is driven by a servo motor equipped with a position detector, comprising a reference counter (16) for counting the value detected by the position detector, a storage unit (17) for storing the capacity of the reference counter of when the moving part is moved in a predetermined direction and is positioned at the position of mechanical origin, a reference counter reading unit (18) for reading the value of the reference counter of when the moving part is positioned, a counter capacity reading unit (19) for reading the counter capacity of the reference counter, and an adjustment amount calculation unit (20) for calculating the amount of adjusting the position of mechanical origin based on the value of the reference counter and on the capacity of the reference counter.

4 Claims, 5 Drawing Sheets

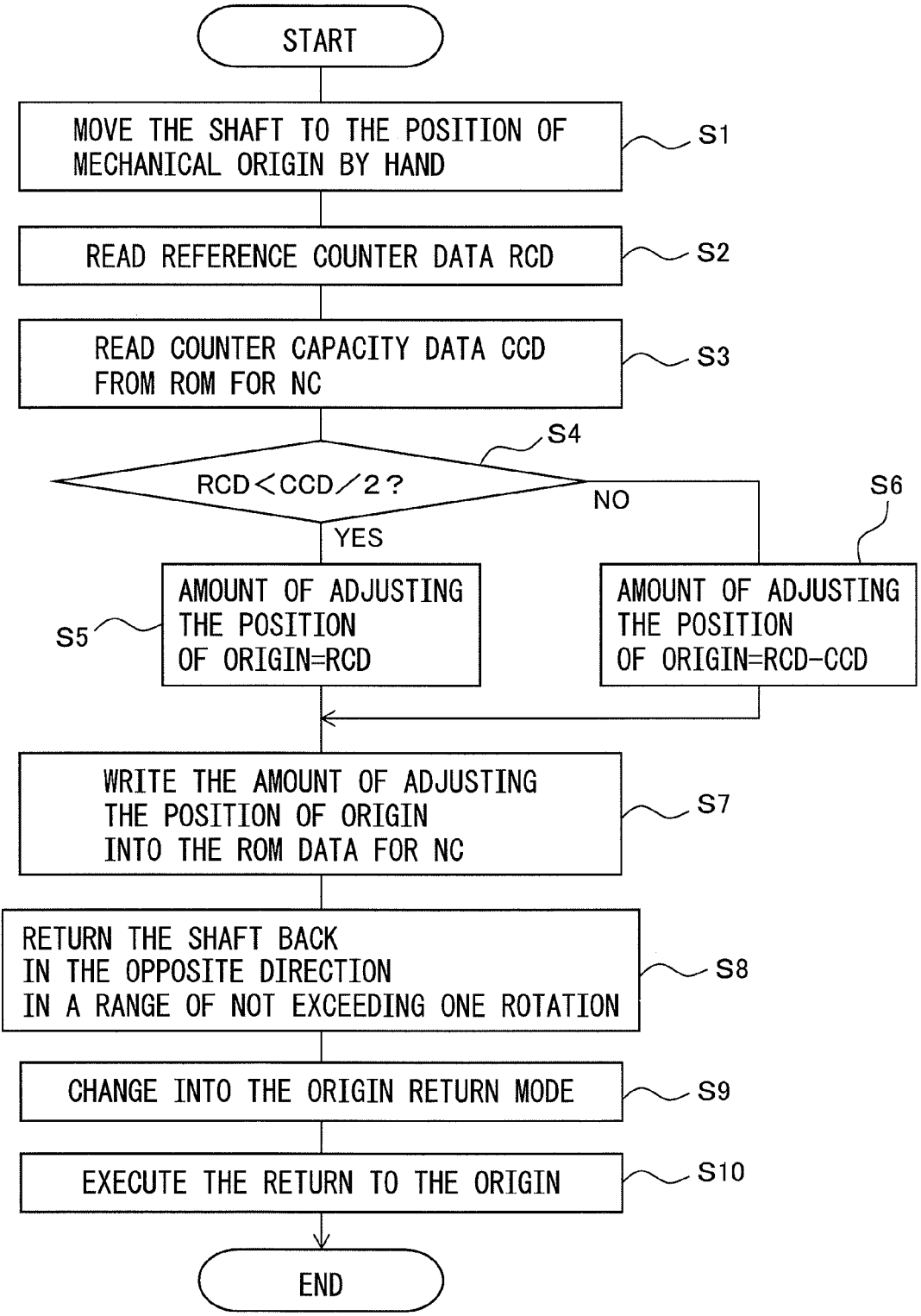

METHOD OF ADJUSTING THE POSITION OF ORIGIN OF A MACHINE AND A MACHINE HAVING A FUNCTION FOR ADJUSTING THE POSITION OF ORIGIN

RELATED APPLICATION DATA

This application claims priority under 35 U.S.C. §119 and/or §365 to Japanese Application No. 2011-223216 filed Oct. 7, 2011, the entire contents of which are incorporated herein by reference.

PRIOR ART

1. Technical Field

This invention relates to a method of adjusting the position of origin for validating the mechanical origin in a machine having a moving part driven by a servo motor, such as machine tool, electrical discharge machine tool, injection-forming machine, robot or industrial machine, and to a machine having a function for adjusting the position of origin.

2. Description of the Related Art

In a machine having a moving part driven by a servo motor (hereinafter referred to simply as "motor"), such as a machine tool, electrical discharge machine tool, injection-forming machine, robot or industrial machine, a workpiece is often fixed to a predetermined position by using a jig.

FIG. 4 is a top view of a workpiece and peripheral equipment. As shown in FIG. 4, a workpiece W of the shape of a flat plate is placed on a workpiece-placing plate 1. The workpiece W is fixed by using two jigs 2a and 2b so will not to move in the X- and Y-directions. Further, it is presumed that the workpiece-placing plate 1 is mounted on a machine having a moving part that is driven by the servo motor.

As can be seen from FIG. 4, a machining-start hole of a predetermined shape has been formed in the workpiece W at a predetermined position. The machining-start hole is also called workpiece origin OW. With the workpiece origin OW as a reference, dimensions for machining the workpiece W are specified by the drawings and the like. In an attempt to simplify the working operations in such a case, the data of position (positional difference) between the workpiece origin OW and a mechanical origin OM are registered as a workpiece coordinate system in advance.

The mechanical origin OM set in the workpiece-placing plate 1 of FIG. 4 is maintained when the servo motor (not shown) of the machine is being connected to a control unit (not shown) and the power source is maintained alive. However, when assembling or transferring the machine or when the power source for maintaining the data, such as a dry cell, is depleted, the data of the mechanical origin OM are no longer present or are often erased.

In such a case, the mechanical origin OM must be set. A concrete method of setting the mechanical origin OM has been disclosed in, for example, Japanese Unexamined Patent Publication No. 62-95604.

The mechanical origin OM is not an arbitrary position but is determined depending on a relative position between the moving part such as shaft (not shown) of the machine and the fixed portion such as workpiece-placing plate 1. Further, in order that the mechanical origin OM can be more correctly set irrespective of the skill of a worker, the mechanical origin OM is set by using a one-rotation signal of a pulse coder. Usually, the position dependent upon the one-rotation signal of the pulse coder does not correctly represent the position of mechanical origin OM and, therefore, the position of mechanical origin OM must be adjusted.

FIGS. 5A to 5C are diagrams illustrating the action for adjusting the position of mechanical origin OM according to a prior art. In these diagrams, the abscissas represent the position of the machine and the ordinates represent the data RCD of a reference counter. The reference counter operates as a reversible counter and outputs a grid signal for every input of a predetermined amount of pulses related to a position on the abscissa.

For instance, if the reference counter has a counter capacity CCD of 50,000 and if a pulse at a position on the abscissa has a weight that is set to 0.01 then a grid data is produced for every 500,000 distribution pulses, i.e., for every moving amount of 5 mm.

If the data RCD of the reference counter reaches a predetermined value that corresponds to one rotation of a pulse coder attached to the motor, the reference counter outputs a one-rotation signal (represented by white squares in FIGS. 5A to 5C). In these diagrams, a value of the reference counter before adjusted is represented by a broken line. A plurality of vertexes on the broken line represents one-rotation signals of the pulse coder. Hereinafter, concretely described with reference to FIGS. 5A to 5C is a method of setting the amount of adjusting the position of mechanical origin OM according to the prior art.

(1) Referring, first, to FIG. 5A, the shaft of the machine is moved to the position of mechanical origin OM (see a white circle in FIG. 5A). The reference counter in this case has an arbitrary data RCD. Further, a coordinate value between the mechanical origin OM and a temporary mechanical origin assumes an arbitrary value. In the example of FIG. 5A, a coordinate value of −2.000 mm is present between the position of temporary origin and the mechanical origin OM. Though no parts have been assembled at the start of assembling the machine, it is necessary to set a position of temporary origin from the standpoint of convenience in the step of assembling. Therefore, in FIG. 5A, the origin has been set to the position of temporary origin.

(2) Then, referring to a positional relationship shown in FIG. 5A, the mechanical origin OM is invalidated (origin is lost) and is, thereafter, validated again.

(3) Power source of the control unit is restarted, and the mechanical coordinate value is preset by the internal processing of the control unit. Thus, the coordinate value of the shaft at the present position becomes 0.0000 mm.

(4) The origin at this position is invalidated again (origin is lost).

(5) The shaft is moved in an origin return mode and is halted at the position of one rotation of the motor. Referring to FIG. 5B, the present position of the shaft (white circle) is in agreement with an one-rotation signal (white square). The coordinate value of the shaft at the present position at this moment is 1.0000 mm.

(6) The amount of adjusting the position of origin OM is calculated based on the coordinate value that is indicated, and is set to the ROM for NC. In this case, the coordinate value of the shaft at the present position is 1.0000 mm (=1000 μm) and, therefore, the calculation is done 1000/0.01 (μm)=100,000 while the sign is inverted, and is set as the amount of adjusting the position of origin.

(7) The origin is invalidated again.

(8) The shaft is returned back in the opposite direction in a range of not exceeding one rotation, is moved in the origin return mode, and the origin is set at the position of one rotation of the motor. Since the amount of adjustment has been set as described above, the coordinate value of the shaft at the present position is 0.0000 as represented by a solid line in FIG. 5C. Therefore, the position set in (1) is finally a correct position of origin.

The above working operations are carried out by the operator by eye and are cumbersome. In addition, jigs for positioning are necessary depending upon the shaft, and extended periods of time are needed for the settings. Therefore, it is desired to adjust the position of origin only once when assembling the machine. Further, the time for the working operations varies to a considerable degree depending upon the skill of the operator.

The present invention was accomplished in view of the above-mentioned circumstances and has an object of providing a method of adjusting the position of origin of a machine, which is capable of more easily setting the position of origin while shortening the time for working operations and a machine having a function for adjusting the position of origin.

SUMMARY OF THE INVENTION

In order to achieve the above object according to a first aspect, a method of adjusting the position of mechanical origin of a machine having a moving part that is driven by a servo motor equipped with a position detector, comprising the steps of moving the moving part in a predetermined direction to position it at the position of mechanical origin, reading a value of a reference counter that counts the value detected by the position detector at a moment when the moving part is positioned, reading a counter capacity of the reference counter, and calculating the amount of adjusting the position of mechanical origin based on the value of the reference counter of when the moving part is positioned and on the capacity of the reference counter is provided.

According to a second aspect as set forth in the first aspect, the machine is a machine tool, an electric discharge machine tool, an injection-forming machine, an industrial machine or a robot.

According to a third aspect, a machine having a function for adjusting the position of mechanical origin of a moving part that is driven by a servo motor equipped with a position detector, comprising a reference counter for counting the value detected by the position detector, a storage unit for storing the capacity of the reference counter of when the moving part is moved in a predetermined direction and is positioned at the position of mechanical origin, a reference counter reading unit for reading the value of the reference counter of when the moving part is positioned, a counter capacity reading unit for reading the counter capacity of the reference counter, and an adjustment amount calculation unit for calculating the amount of adjusting the position of mechanical origin based on the value of the reference counter and on the capacity of the reference counter is provided.

According to a fourth aspect as set forth in the third aspect, the machine is a machine tool, an electric discharge machine tool, an injection-forming machine, an industrial machine or a robot.

These objects, features and advantages of the invention as well as other objects, features and advantages thereof will become obvious from the detailed description of a typical embodiment of the invention shown in the accompanying drawings.

BRIEF DESCRIPTION OF THE DRAWINGS

FIG. 2 is a flowchart for illustrating a method of adjusting the position of origin of the machine based on the present invention;

DETAILED DESCRIPTION

Figure 1:
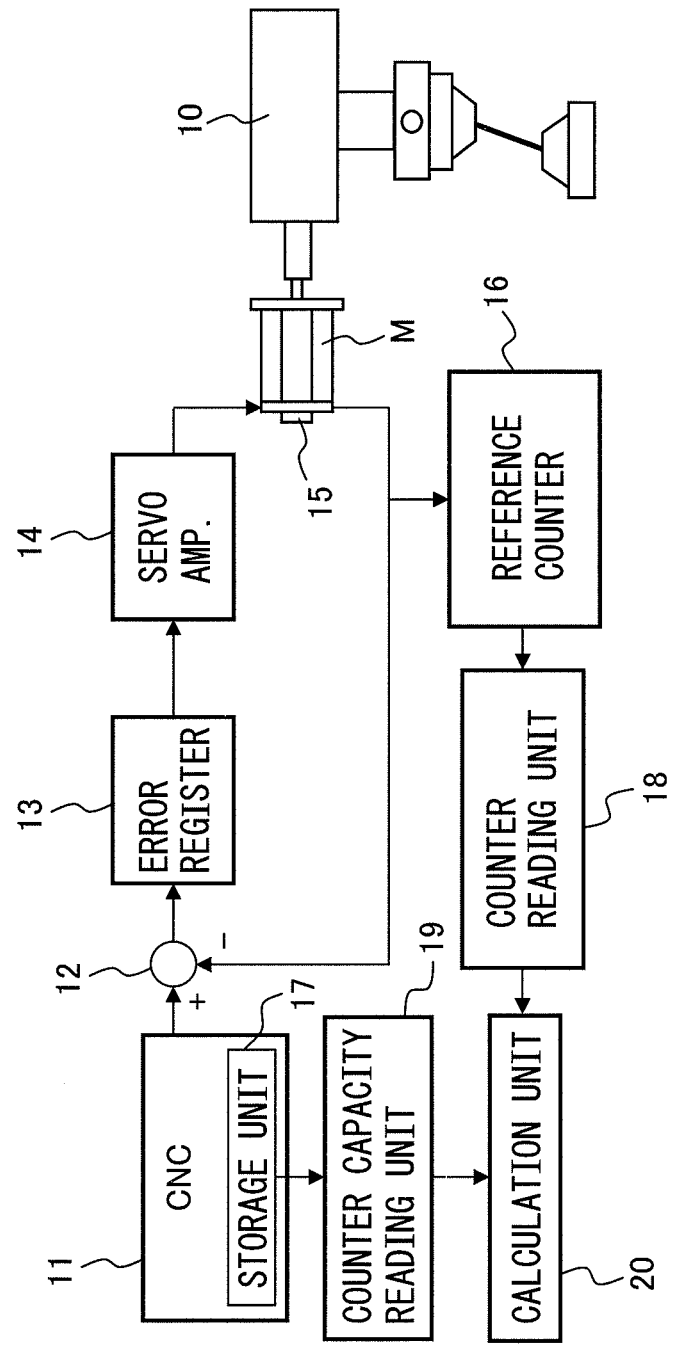
FIG. 1 is a functional block diagram of a machine based on the present invention.

An embodiment of the invention will now be described with reference to the accompanying drawings in which the same members are denoted by the same reference numerals. For easy comprehension, the drawings are on arbitrary scales.

FIG. 1 is a functional block diagram of a machine based on the present invention. As shown in FIG. 1, a servo motor M is used for driving a mechanism-moving part 10 of the machine such as machine tool, electric discharge machine tool, injection-forming machine, robot or industrial machine. In other words, the moving amount of the mechanism-moving part 10 is determined depending upon the amount of rotation of the shaft of the servo motor M.

In FIG. 1, a CNC 11 produces a motion command value for the shaft of the servo motor M. The servo motor M is provided with a pulse coder 15 which detects the position of the shaft of the servo motor M for every predetermined control period. The position value detected by the pulse coder 15 is subtracted from the motion command value at a subtractor 12, and is input to an error register 13. A voltage signal is commanded depending on an amount of error output from the error register 13. The voltage signal is amplified through a servo amplifier 14 and is input to the servo motor M.

Referring to FIG. 1, the position value detected by the pulse coder 15 is also input to a reference counter 16. The counter capacity data CCD of the reference counter 16 is stored in a storage unit 17 of the CNC 11. The reference counter 16 counts the position value detected by the pulse coder 15 and updates the reference counter data RCD. A grid signal is output as the reference counter data RCD reaches a predetermined amount.

In this connection, the grid is an electronic grid point produced by a counter that uses, as an initial value, a value that is set for a parameter with reference to the one-rotation signal produced for every rotation of the pulse coder 15 (position detector). For example, the counter capacity data CCD of the reference counter 16 is presumed to be 500,000 and the weight of one pulse is presumed to be 0.01 µm. In this case, the grid signal is output for every 500,000 distribution pulses, i.e., for every moving amount of 5 mm. Further, as the value of the reference counter reaches a predetermined value that corresponds to one rotation of the pulse coder, the reference counter produces a one-rotation signal.

In addition, as shown in FIG. 1, the reference counter data RCD of the reference counter 16 is read by the counter reading unit 18 and is input to a calculation unit 20. Based on the reference counter data RCD and the counter capacity data CCD, the calculation unit 20 calculates the amount of adjusting the position of mechanical origin in a manner as described below.

Figure 3A:
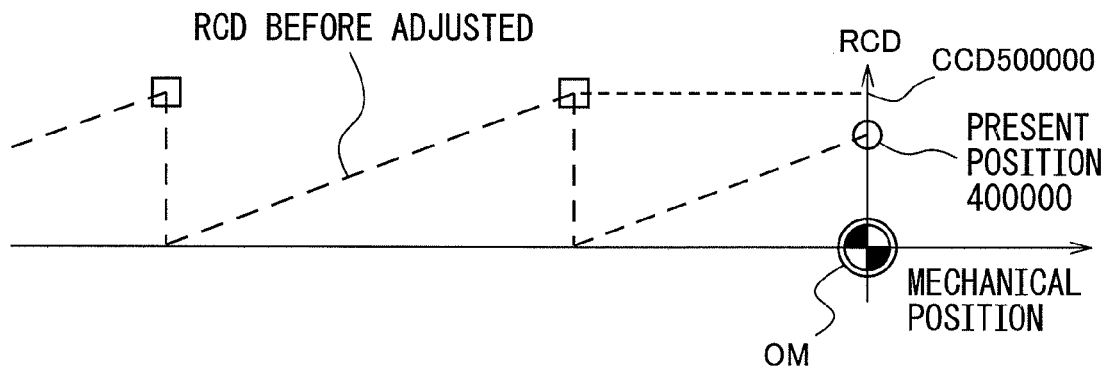
FIG. 3A is a first diagram for illustrating the action for adjusting the position of mechanical origin OM based on the present invention.
Figure 3B:
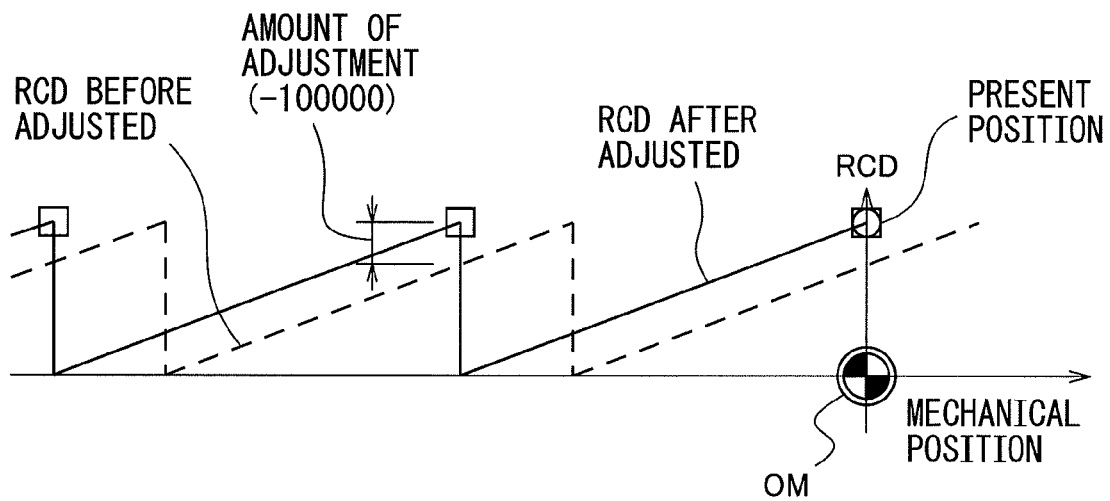
FIG. 3B is a second diagram for illustrating the action for adjusting the position of mechanical origin OM based on the present invention.

FIG. 2 is a flowchart for illustrating a method of adjusting the position of origin of the machine based on the present invention. FIGS. 3A and 3B are diagrams for illustrating the action for adjusting the position of mechanical origin OM based on the present invention. In these drawings, the abscissas represent the mechanical position and the ordinates represent the data RCD of the reference counter. Further, in these drawings, the one-rotation signals are represented by white squares.

In this connection, the machine inclusive of the mechanism-moving part 10 is provided with a workpiece W and a workpiece-placing plate 1. As described with reference to FIG. 4, the workpiece W of the shape of a flat plate is placed on the workpiece-placing plate 1. The workpiece W is fixed by two jigs 2a and 2b so will not to move in the XY-directions. Further, the workpiece-placing plate 1 is attached to the machine having the moving part that is driven by the servo motor.

Figure 4:
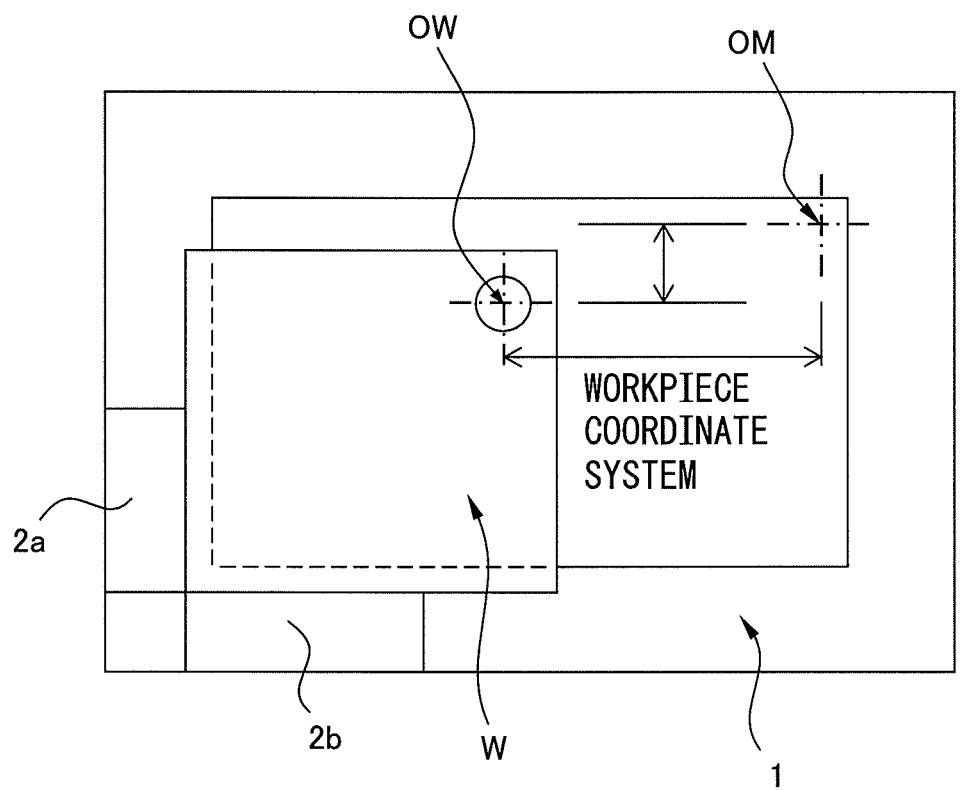
FIG. 4 is a top view of a workpiece and peripheral equipment.
Figure 5A:
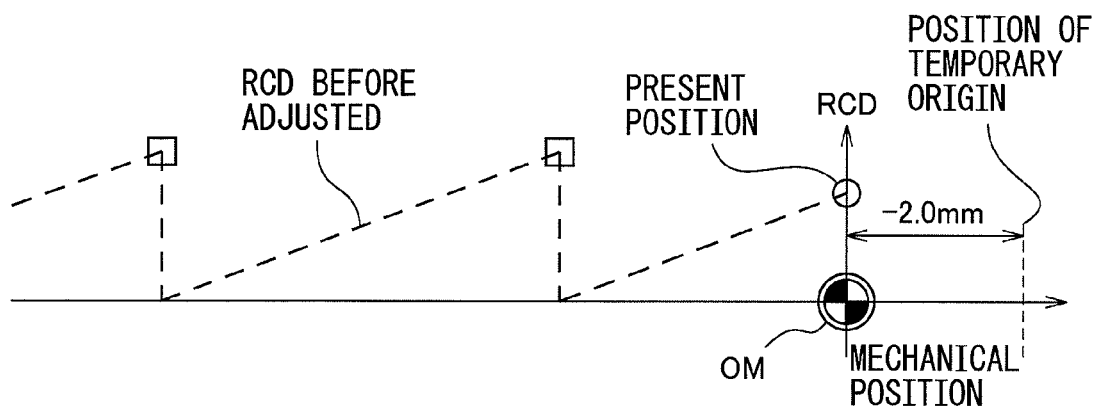
FIG. 5A is a first diagram for illustrating the action for adjusting the position of mechanical origin OM according to a prior art.
Figure 5B:
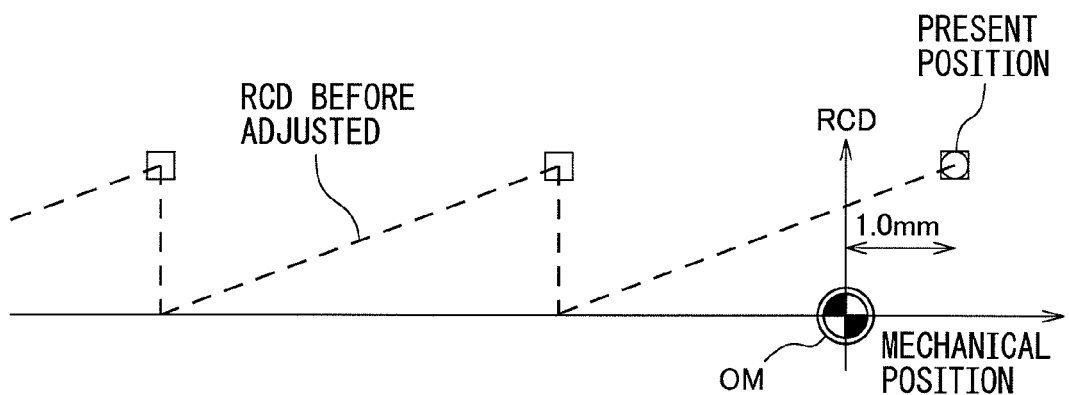
FIG. 5B is a second diagram for illustrating the action for adjusting the position of mechanical origin OM according to the prior art.
Figure 5C:
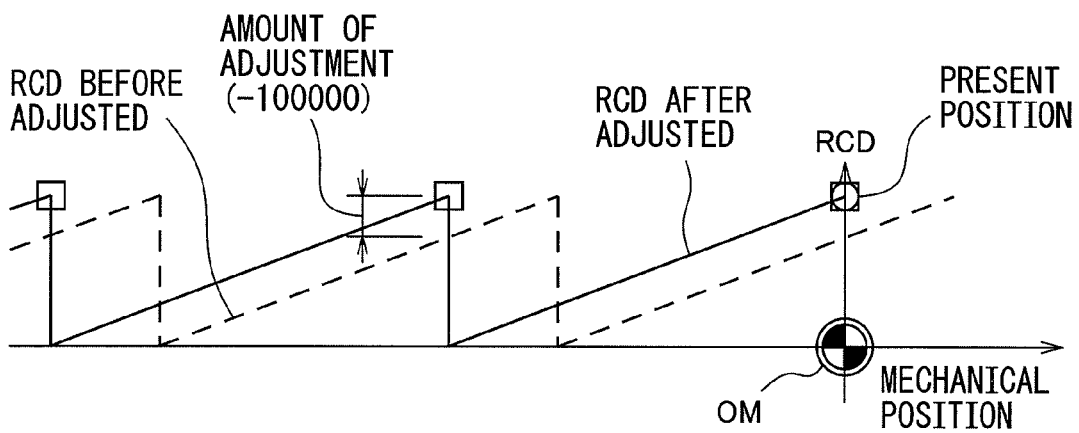
FIG. 5C is a third diagram for illustrating the action for adjusting the position of mechanical origin OM according to the prior art.

As can be seen from FIG. 4, a machining-start hole of a predetermined shape has been formed in the workpiece W at a predetermined position. The machining-start hole is also called workpiece origin OW. With the workpiece origin OW as a reference, dimensions for machining the workpiece W are specified by the drawings and the like. In an attempt to simplify the working operations in such a case, the data of position (positional difference) between the workpiece origin OW and the mechanical origin OM are registered as a workpiece coordinate system in advance. Described below with reference to FIG. 1 to FIG. 3B is the method of adjusting the position of origin of the machine based upon the present invention.

First, at step S1, the operator moves the shaft of the machine to the position of mechanical origin OM by hand. Then, the reference counter data RCD is read from the reference counter 16 through the counter reading unit 18 and, at the same time, the counter capacity data CCD is read from the storage unit 17 through the counter capacity reading unit 19 (steps S2 and S3). In FIG. 3A, the reference counter data RCD is 400,000 and the counter capacity data CCD is 500,000.

Then, at step S4, the calculation unit 20 judges if the reference counter data RCD is smaller than one-half the counter capacity data CCD. This is because it is desired that the amount of adjustment is set with the one-rotation signal as a center. Therefore, if the reference counter data RCD exceeds one-half the counter capacity data CCD, then the method of calculation is better differed to advantage. Further, one-half the counter capacity data CCD is compared with the reference counter data RCD because of the reason that the amount of adjustment may often be quickly calculated if the judgment is rendered based on the next reference counter data RCD.

If the reference counter data RCD is smaller than one-half the counter capacity data CCD, the amount of adjusting the position of origin is set to the reference counter data RCD (step S5). On the contrary, if the reference counter data RCD is not smaller than one-half the counter capacity data CCD, a deviation obtained by subtracting the counter capacity data CCD from the reference counter data RCD is set as the amount of adjusting the position of origin (step S6). In the embodiment shown in FIG. 3A, the calculation unit 20 sets 400,000−500,000=−100,000 (=RCD−CCD) as the amount of adjusting the position of origin.

Then, at step S7, the amount of adjusting the position of origin that is set is written into the ROM data for NC (not shown). Thereafter, the shaft is returned back in the opposite direction in a range of not exceeding one rotation, the shaft is moved in the origin return mode, and the origin is set at the position of one rotation of the motor. Thus, as represented by a solid line in FIG. 3B, the present position (white circle) comes in agreement with the one-rotation signal (white square). Since the amount of adjusting the position of origin has been set as described above, the value of the reference counter 16 becomes zero when the origin is set.

According to the prior art mentioned above, the amount of adjusting the position of origin is set based on the mechanical position (abscissa). On the contrary, according to the present invention, the amount of adjusting the position of origin is set based on the reference counter data RCD (ordinate). Therefore, the working time for setting the mechanical position can be shortened, and the position of origin OM can be set more easily. Further, it will be understood that the work for setting the position of origin OM can be conducted irrespective of the skill of the operator.

EFFECTS OF THE INVENTION

According to the first and third aspects, the amount of adjusting the position of origin is set based on the reference counter data. Therefore, the working time for setting the mechanical position can be shortened, and the position of origin can be more easily set.

According to the second and fourth aspects, the invention can be applied to many kinds of machines.

Though the invention was described above by way of a representative embodiment, it will be understood that a person skilled in the art may make the above-mentioned modifications, various other modifications, omissions or additions without departing from the scope of the present invention.

The invention claimed is:

1. A method of adjusting the position of mechanical origin of a machine having a moving part that is driven by a servo motor equipped with a position detector, comprising the steps of:
    moving said moving part in a predetermined direction to position said moving part at the position of mechanical origin;
    reading a value of a reference counter that counts the value detected by said position detector and that is preset to a determined value for every rotation of the servo motor, at a moment when said moving part is positioned;
    reading a counter capacity of said reference counter; and
    calculating the amount of adjusting said position of mechanical origin based on the value of the reference counter of when said moving part is positioned and on the capacity of the reference counter,
    wherein of the value of the reference counter is smaller than one-half the counter capacity, the amount of adjusting the position of origin is set to the value of the reference counter, and if the value of the reference counter is not smaller than one-half the counter capacity, a deviation obtained by subtracting the counter capacity from the value of the reference counter is set as the amount of adjusting the position of origin.

2. The method of adjusting the position of mechanical origin according to claim 1, wherein said machine is a machine tool, an electric discharge machine tool, an injection-forming machine, an industrial machine or a robot.

3. A machine having a function for adjusting the position of mechanical origin of a moving part that is driven by a servo motor equipped with a position detector, comprising:

a reference counter for counting the value detected by said position detector;

the reference counter being preset to a determined value for every rotation of the servo motor;

a storage unit for storing the capacity of the reference counter of when said moving part is moved in a predetermined direction and is positioned at the position of mechanical origin;

a reference counter reading unit for reading the value of said reference counter of when said moving part is positioned;

a counter capacity reading unit for reading the counter capacity of said reference counter; and an adjustment amount calculation unit for calculating the amount of adjusting said position of mechanical origin based on the value of the reference counter and on the capacity of the reference counter, wherein of the value of the reference counter is smaller than one-half the counter capacity, the amount of adjusting the position of origin is set to the reference counter, and if the value of the reference counter is not smaller than one-half the counter capacity, a deviation obtained by subtracting the counter capacity from the value of the reference counter is set as the amount of adjusting the position of origin.

4. The machine according to claim 3, wherein said machine is a machine tool, an electric discharge machine tool, an injection-forming machine, an industrial machine or a robot.

* * * * *